Patented Dec. 24, 1935

2,025,367

UNITED STATES PATENT OFFICE 2,025,367

PROCESS OF MANUFACTURING ACTIVE CARBON

Victor Weerts, Brussels, Belgium

No Drawing. Application June 12, 1934, Serial No. 730,363. In Belgium June 14, 1933

1 Claim. (Cl. 252—3)

The present invention relates to processes for the manufacture of active carbon.

It is well known that if certain originating vegetable matters, such as sawdust, cellulose, peat, etc. are exposed to the action of a dehydrating agent, such as zinc chloride or sulphuric acid and the mass is heated to a certain temperature for a suitable period of time, it becomes carbonized. The product obtained, freed from excess dehydrating agent for example by washing, then boiled in a bath of hydrochloric acid to chlorinate the zinc oxide formed in the course of carbonization (if zinc chloride is used) or to chlorinate the metals or oxides of any kind which the material may contain, and finally washed again to remove the excess chloride and hydrochloric acid, is utilized under the name of active carbon. This product is used in sugar factories, sweet factories, etc. for clarifying sugar juices, alcohols, wines, etc.

The aforesaid process is disadvantageous in that it necessitates the use of a large quantity of the chemical agent, and moreover results in an active carbon product of granular form and relatively low absorptive capacity.

It has further been proposed to prepare active carbon from rice hulls, rice straw or rice chaff (selected by reason of their silica content) by carbonizing them out of contact with free oxygen and treating the charred product with an alkali solution to dissolve out the resinous matter present. This again produces a granular carbon of relatively low absorptive capacity.

Divers other processes have been proposed for treating a starting material consisting of an already activated carbon with different chemical agents (acids, alkalies, chlorides and other salts) and strong heating, but these processes likewise have disadvantages, such as the production of a granular carbon, or the reduction of the absorptive capacity by alkaline agents, as well as being costly.

The present invention has for an object to provide an improved process of manufacturing active carbon of the required quality and yet of moderate cost.

According to the invention the crude originating material, such as peat, is carbonized and added while still hot directly to a sprayed solution of zinc chloride or another so-called dehydrating agent (that is, a substance having the property of absorbing water or the elements of water; although in the present instance the purifying action effected is not, in the ordinary sense, dehydration).

Preferably, after the mingling of the hot carbonized material with the salt solution, the mixture is digested at a temperature of about 350° C.

The carbonization is easily carried out as by external heating without necessitating the use of any special material. The crude material loses about six tenths of its original weight and its volume is reduced, whereby the subsequent operations are facilitated. Moreover, the step is of low cost, because the considerable amount of heat which the material takes up in its carbonization is recovered when the material is mingled directly in hot condition with a cold or slightly heated solution of zinc chloride or other "dehydrating" agent. The whole process may be effected in a boiler adapted to be heated by any suitable means.

Due to the initial carbonization, the required quantity of zinc chloride is greatly reduced, and the quantity of heat to be supplied by the furnace is very small as compared with that required by other processes, owing to the recovery of heat as mentioned above and the great rapidity of the purifying process.

In addition, the quantity of purifying or "dehydrating" agent to be utilized being so small, the excess which remains in the mass is not worth recovering by a first washing, and the material obtained may be subjected directly to the action of hydrochloric acid solution for chlorination in the manner described above. The chlorides formed are washed out; then after neutralization as may be necessary, the mass is subjected to crushing for producing the commercial product.

The following is a specific example of one mode of carrying out the process according to the invention.

100 kgs. of organic material, for example peat, are carbonized at a temperature of from 200–300° C. When this treatment is finished, which will be after about 30 minutes, 50–100 litres of a sprayed solution of zinc chloride at about 50–52° Baumé, are introduced. By reason of this addition of salt solution, the temperature of the mass is reduced to about 100°–150° C., and external heat is therefore applied to raise the temperature of the mixture to about 350° C., whereafter the mixture is digested for about 30–40 minutes. The digested product, after being washed with water at a temperature of 80–100° C., is boiled for several minutes with 1 to 5% of its weight of hydrochloric acid solution at 20–22° Baumé, then again washed until the chlorides are eliminated. The active carbon product is finally crushed to the required fineness.

The process of manufacturing active carbon according to the invention combines the advantages of requiring minimum quantities of the chemical treating agents and the minimum of externally applied heat, and enables the number of operations and the labor of supervision to be considerably reduced as compared with the known processes. Moreover, the product, though very much cheaper, reveals a most remarkable activity.

What I claim is:

A process for manufacturing active carbon from peat and similar crude originating vegetable material, consisting in carbonizing the crude material, bringing the carbonized material into a sprayed solution of zinc chloride, and digesting the mixture to a temperature of about 300°.

VICTOR WEERTS.